United States Patent
Chang

(10) Patent No.: US 12,524,972 B2
(45) Date of Patent: Jan. 13, 2026

(54) METHOD FOR PROVIDING VISUAL CUE IN VISUAL CONTENT, HOST, AND COMPUTER READABLE STORAGE MEDIUM

(71) Applicant: HTC Corporation, Taoyuan (TW)

(72) Inventor: Yi-Hsin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 195 days.

(21) Appl. No.: 18/448,189

(22) Filed: Aug. 11, 2023

(65) Prior Publication Data
US 2025/0054242 A1 Feb. 13, 2025

(51) Int. Cl.
*G06T 19/00* (2011.01)
*G06T 7/70* (2017.01)
*G06T 19/20* (2011.01)

(52) U.S. Cl.
CPC .............. *G06T 19/006* (2013.01); *G06T 7/70* (2017.01); *G06T 19/20* (2013.01)

(58) Field of Classification Search
CPC ...... G06T 19/003; G06T 19/006; G06T 19/20
See application file for complete search history.

(56) References Cited

U.S. PATENT DOCUMENTS

| 7,864,173 | B2 | 1/2011 | Handley et al. |
| 2017/0256096 | A1* | 9/2017 | Faaborg ................ G06T 19/003 |
| 2017/0372499 | A1* | 12/2017 | Lalonde ................ G06T 19/006 |

FOREIGN PATENT DOCUMENTS

| CN | 108780358 | 11/2018 |
| CN | 111857364 | 10/2020 |
| TW | 202115679 | 4/2021 |

OTHER PUBLICATIONS

"Office Action of Taiwan Counterpart Application", issued on Jun. 27, 2024, p. 1-p. 10.

* cited by examiner

*Primary Examiner* — Charles Tseng
(74) *Attorney, Agent, or Firm* — JCIPRNET

(57) ABSTRACT

The embodiments of the disclosure provide method for providing a visual cue in a visual content, a host, and a computer readable storage medium. The method includes: providing, by the host, the visual content, wherein the visual content comprises a virtual bearing object; determining, by the host, a relative position between a reference point and the virtual bearing object; and in response to determining that the relative position meets a predetermined condition, modifying, by the host, an appearance of the virtual bearing object based on the relative position.

14 Claims, 4 Drawing Sheets

METHOD FOR PROVIDING VISUAL CUE IN VISUAL CONTENT, HOST, AND COMPUTER READABLE STORAGE MEDIUM

BACKGROUND

1. Field of the Invention

The present disclosure generally relates to a mechanism for adjusting a visual content, in particular, to a method for providing a visual cue in a visual content, a host, and a computer readable storage medium.

2. Description of Related Art

Along with the development of virtual reality (VR) technology, the visual content provided in the VR service/application is getting more realistic. However, the realistic visual content may cause some accident.

For example, the visual content may show some virtual objects such as chairs, benches and/or tables, which may be too realistic to let users forget that these objects are virtual. In this case, the user may attempt to sit on or lean to the virtual chairs, benches and/or tables, which may cause the user to fall and get injured.

SUMMARY OF THE INVENTION

Accordingly, the disclosure is directed to a method for providing a visual cue in a visual content, a host, and a computer readable storage medium, which may be used to solve the above technical problems.

The embodiments of the disclosure provide a method for providing a visual cue in a visual content, adapted to a host. The method includes: providing, by the host, the visual content, wherein the visual content comprises a virtual bearing object; determining, by the host, a relative position between a reference point and the virtual bearing object; and in response to determining that the relative position meets a predetermined condition, modifying, by the host, an appearance of the virtual bearing object based on the relative position.

The embodiments of the disclosure provide a host, including a storage circuit and a processor. The storage circuit stores a program code. The processor is coupled to the non-transitory storage circuit, and accessing the program code to perform: providing a visual content, wherein the visual content comprises a virtual bearing object; determining a relative position between a reference point and the virtual bearing object; and in response to determining that the relative position meets a predetermined condition, modifying an appearance of the virtual bearing object based on the relative position.

The embodiments of the disclosure provide a non-transitory computer readable storage medium, the computer readable storage medium recording an executable computer program, the executable computer program being loaded by a host to perform steps of: providing a visual content, wherein the visual content comprises a virtual bearing object; determining a relative position between a reference point and the virtual bearing object; and in response to determining that the relative position meets a predetermined condition, modifying an appearance of the virtual bearing object based on the relative position.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
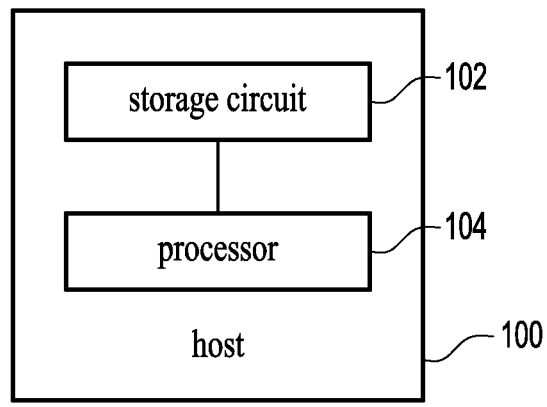
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 100 can be a head-mounted display (HMD) capable of showing/providing visual contents (e.g., AR/VR contents) for the wearer/user to see. For better understanding the concept of the disclosure, the host 100 would be assumed to be the HMD for providing VR contents (e.g., the VR world) to the user, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules stored in the storage circuit 102 to implement the method for providing a visual cue in a visual content provided in the disclosure, which would be further discussed in the following.

Figure 2:
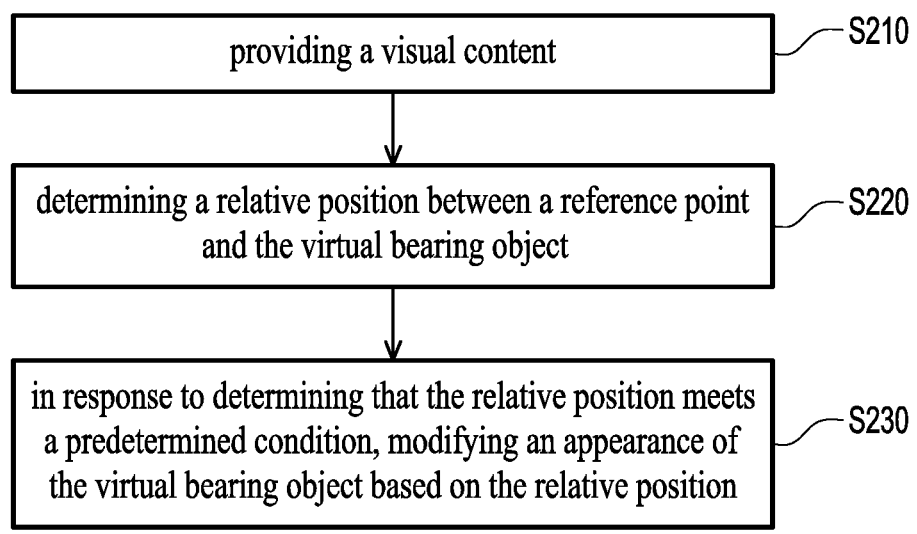
FIG. 2 shows a flow chart of the method for providing a visual cue in a visual content according to an embodiment of the disclosure.

See FIG. 2, which shows a flow chart of the method for providing a visual cue in a visual content according to an embodiment of the disclosure. The method of this embodiment may be executed by the host 100 in FIG. 1, and the details of each step in FIG. 2 will be described below with the components shown in FIG. 1.

Firstly, in step S210, the processor 104 provides a visual content, wherein the visual content includes a virtual bearing object. In various embodiments, the virtual bearing object can be any virtual object having a virtual bearing surface that visually provides a bearing function. For example, the virtual bearing object can be a virtual chair, a virtual table, a virtual couch, a virtual bed, or the like. In some embodiments, the virtual bearing object can even be a virtual rock, a virtual stair, a virtual box, or the like.

In one embodiment, the virtual bearing object having the bearing function can be understood as visually sittable to the user. That is, the user may want to sit on the virtual bearing object when immersing in the visual content.

However, since the virtual object only exists in the visual content, the virtual object cannot be used to bear any real world object, including the user's body. That is, if the user accidentally tries to sit on the virtual bearing object in the visual content, the user would fall and may get injured. Therefore, the processor 104 may proceed the following operations for avoiding this hazard.

In step S220, the processor 104 determines a relative position between a reference point and the virtual bearing object. In step S230, in response to determining that the relative position meets a predetermined condition, the processor 104 modifies an appearance of the virtual bearing object based on the relative position.

In different embodiments, the processor 104 may determine whether the relative position between the reference point and the virtual bearing object meets the predetermined condition.

Figure 3A:
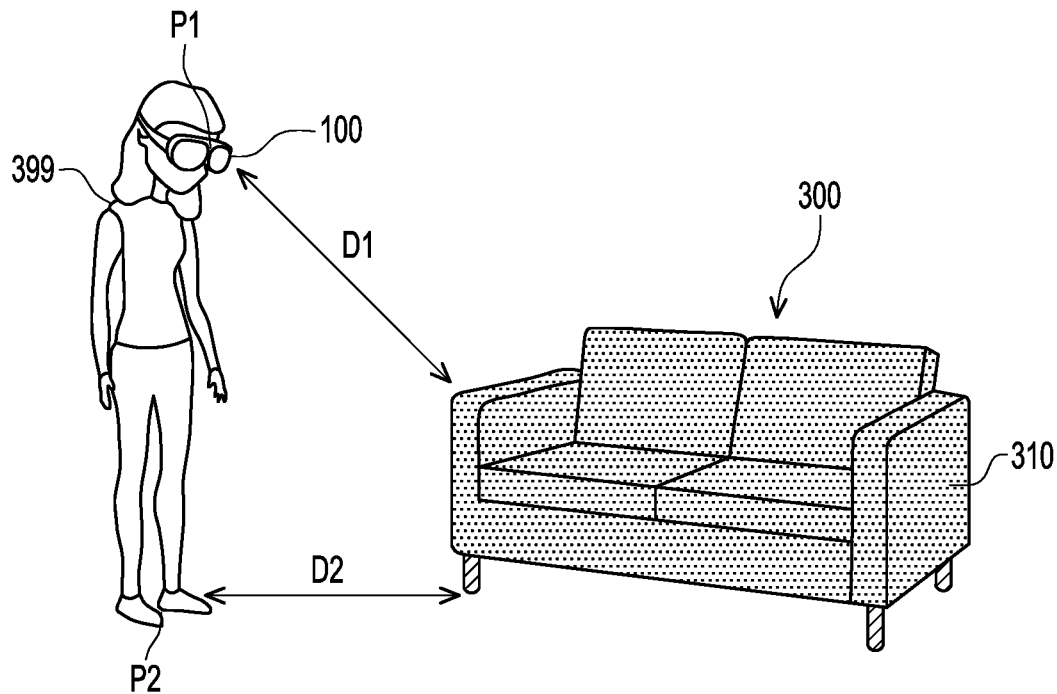
FIG. 3A shows a schematic diagram of determining the relative position between the reference point and the virtual bearing object according to a first embodiment of the disclosure.

See FIG. 3A, which shows a schematic diagram of determining the relative position between the reference point and the virtual bearing object according to a first embodiment of the disclosure.

In FIG. 3A, the host 100 may be the HMD worn by the user 399, and the host 100 may show the visual content 300 (e.g., the VR content) for the user 399 to see. In the embodiment, the visual content 300 includes a virtual bearing object 310, which may be a virtual couch in the visual content 300, and since the virtual couch only exists in the VR world, the virtual couch cannot be used to bear any real word object.

In FIG. 3A, the considered reference point may be the user representative object in the visual content, which may be the point P1 characterizing the user 399 in the visual content. Alternatively, the considered reference point may be a projection point P2 of the host 100 on a floor plane in the visual content 300. In one embodiment, the projection point P2 may the projection point of the point P1 on the floor plane in the visual content 300, but the disclosure is not limited thereto. In one embodiment, the user representative object may be just a point characterizing the user in the visual content, such as a user reference point. Alternatively, the reference point may be a point characterizing the position/coordinate of the host 100 (e.g., the HMD) in the visual content (e.g., the VR world).

In one embodiment, the processor 104 may determine whether a specific distance between the reference point and the virtual bearing object 310 is less than a first distance threshold. In FIG. 3A, the considered specific distance may be the distance D1 between the point P1 and the virtual bearing object 310 or the distance D2 between the projection point P2 and the virtual bearing object 310, depending on which of the point P1 and the projection point P2 is used as the reference point, but the disclosure is not limited thereto.

In one embodiment, the first distance threshold may be any distance preferred by the designer, such a 1 meter, but the disclosure is not limited thereto.

In response to determining that the specific distance between the reference point and the virtual bearing object is less than the first distance threshold, the processor 104 may determine that the relative position between the reference point (e.g., the point P1 or the projection point P2) and the virtual bearing object 310 meets the predetermined condition.

On the other hand, in response to determining that the specific distance between the reference point and the virtual bearing object is not less than the first distance threshold, the processor 104 may determine that the relative position between the reference point (e.g., the point P1 or the projection point P2) and the virtual bearing object 310 does not meet the predetermined condition.

Figure 3B:
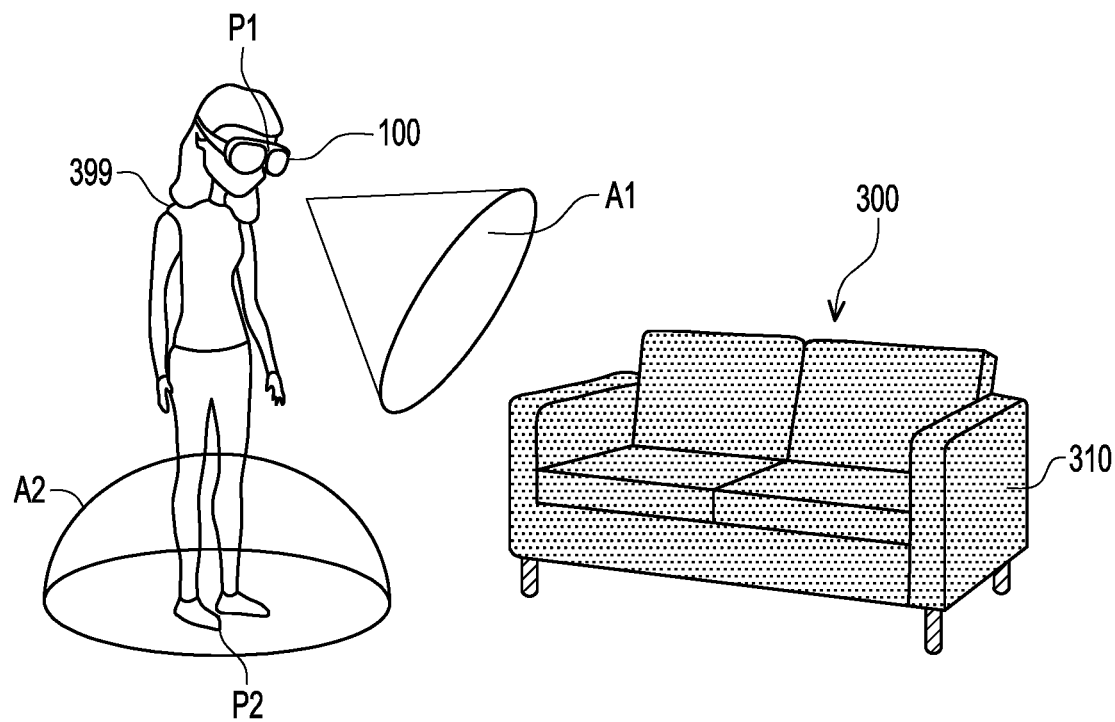
FIG. 3B shows a schematic diagram of determining the relative position between the reference point and the virtual bearing object according to a second embodiment of the disclosure.

See FIG. 3B, which shows a schematic diagram of determining the relative position between the reference point and the virtual bearing object according to a second embodiment of the disclosure. In FIG. 3B, the processor 104 may determine a first reference 3-dimensional area in the visual content 300 based on the reference point.

In the embodiment where the point P1 is considered as the reference point, the processor 104 may determine a cone area A1 in the visual content 300 as the first reference 3-dimensional area. In the embodiment, the cone area A1 can be determined to correspond to the view angle of the user 399, but the disclosure is not limited thereto.

In another embodiment where the projection point P2 is considered as the reference point, the processor 104 may determine a hemispherical area A2 in the visual content 300 as the first reference 3-dimensional area, but the disclosure is not limited thereto.

In the second embodiment, the processor 104 may determine whether the virtual bearing object 310 has an overlapped area with the first reference 3-dimensional area. In response to determining that the virtual bearing object 310 has an overlapped part with the first reference 3-dimensional area, the processor 104 may determine that the relative position between the reference point (e.g., the point P1 or the projection point P2) and the virtual bearing object 310 meets the predetermined condition.

In the scenario of FIG. 3B, since the virtual bearing object 310 has no overlapped area with the first reference 3-dimensional area (e.g., the cone area A1 or the hemispherical area A2), the processor 104 may determine that the relative position between the reference point (e.g., the point P1 or the projection point P2) and the virtual bearing object 310 does not meet the predetermined condition, but the disclosure is not limited thereto.

In other embodiments, the first reference 3-dimensional area in the visual content 300 can be designed with other appearances, such as cylindrical or prism shaped, but the disclosure is not limited thereto.

In one embodiment, in the procedure of modifying the appearance of the virtual bearing object 310, the processor 104 may determine a specific part on the virtual bearing object 310 based on the reference point and modify the appearance of the specific part on the virtual bearing object 310.

In different embodiments, the processor 104 may modify the appearance of the specific part via replacing the specific part with a pass-through view, changing a material of the specific part on the virtual bearing object 310, and/or replacing the specific part with a corresponding frame contour.

Figure 4A:
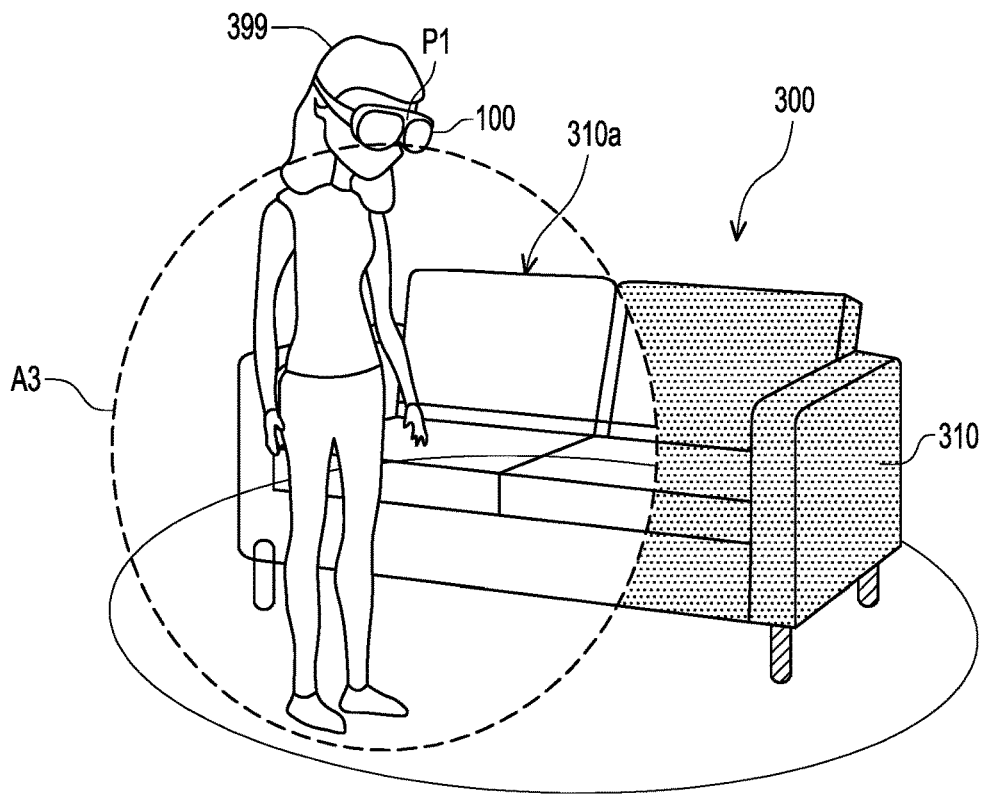
FIG. 4A shows a schematic diagram of modifying the appearance of the virtual bearing object according to a third embodiment of the disclosure.

See FIG. 4A, which shows a schematic diagram of modifying the appearance of the virtual bearing object according to a third embodiment of the disclosure.

In the third embodiment, the processor 104 may determine a second reference 3-dimensional area based on the reference point in the visual content 300. In one embodiment, the processor 104 may directly use the first reference 3-dimensional area (e.g., the cone area A1 and/or the hemispherical area A2) as the second reference 3-dimensional area. In other embodiments, the processor 104 may determine other 3-dimensional area based on the reference point as the second reference 3-dimensional area.

In FIG. 4A, it is assumed that the spherical area A3 is the considered second reference 3-dimensional area. In the embodiment, the finger on the left hand of the user 399 may be regarded as the considered reference point, and the processor 104 may accordingly determine the spherical area A3 by using the reference point as the corresponding center, but the disclosure is not limited thereto.

In one embodiment, the processor 104 may determine whether the virtual bearing object 310 has an overlapped area with the second reference 3-dimensional area (e.g., the spherical area A3). In FIG. 4A, in response to determining that the virtual bearing object 310 has the overlapped part 310a with the second reference 3-dimensional area, the processor 104 may determine the overlapped part 310a as the specific part.

In the third embodiment, the processor 104 may replacing the specific part (e.g., the overlapped area 310a) with a corresponding frame contour of the specific part as shown in FIG. 4A. That is, the user 399 would see that the specific part becomes transparent, but only the corresponding frame contour is preserved.

In this case, the user 399 would notice that the virtual bearing object 310 is not a real world object and would not try to sit on the virtual bearing object 310.

That is, the frame contour of the specific part (e.g., the overlapped area 310a) can be shown as a visual cue for reminding the user 399 that the virtual bearing object 310 is not real. Accordingly, the risk of the user accidentally sitting on the virtual bearing object 310 can be reduced.

Figure 4B:
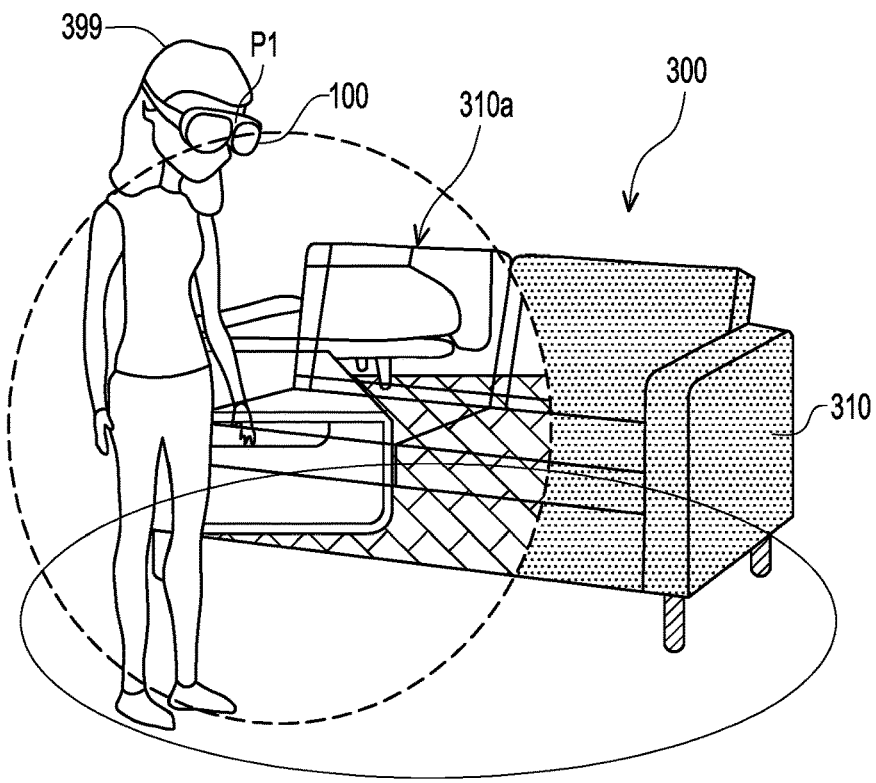
FIG. 4B shows a schematic diagram of modifying the appearance of the virtual bearing object according to a fourth embodiment of the disclosure.

See FIG. 4B, which shows a schematic diagram of modifying the appearance of the virtual bearing object according to a fourth embodiment of the disclosure. In FIG. 4B, in response to determining that the virtual bearing object 310 has the overlapped part 310a with the second reference 3-dimensional area, the processor 104 may replace the specific part (e.g., the overlapped part 310a) with the corresponding frame contour of the specific part and a pass-through view.

In the embodiment, the host 100 may use the front camera to capture the environment image of the environment where the user 399 locates, and the processor 104 may crop the image region corresponding to the specific part from the environment image and show the cropped image region at the position of the specific part as the pass-through view. That is, the user 399 can see the real world scene (which exemplarily shows a real couch, a real table and a real floor) in the pass-through view as shown in FIG. 4B. In this case, the user 399 would notice that the virtual bearing object 310 is not a real world object and would not try to sit on the virtual bearing object 310.

That is, the pass-through view used to replace the specific part can be shown as a visual cue for reminding the user 399 that the virtual bearing object 310 is not real. Accordingly, the risk of the user accidentally sitting on the virtual bearing object 310 can be reduced.

Additionally or alternatively, the processor 104 can change a material of the specific part (e.g., the overlapped part 310a) on the virtual bearing object 300 when modifying the appearance of the specific part. For example, assuming that the virtual bearing object 300 is a fabric couch by default, and after the processor 104 determines the specific part (e.g., the overlapped part 310a), the processor 104 may change the material of the specific part to be, for example, metal. In this case, the user 399 would notice that the virtual bearing object 310 is not a real world object and would not try to sit on the virtual bearing object 310. Accordingly, the risk of the user accidentally sitting on the virtual bearing object 310 can be reduced.

Figure 5:
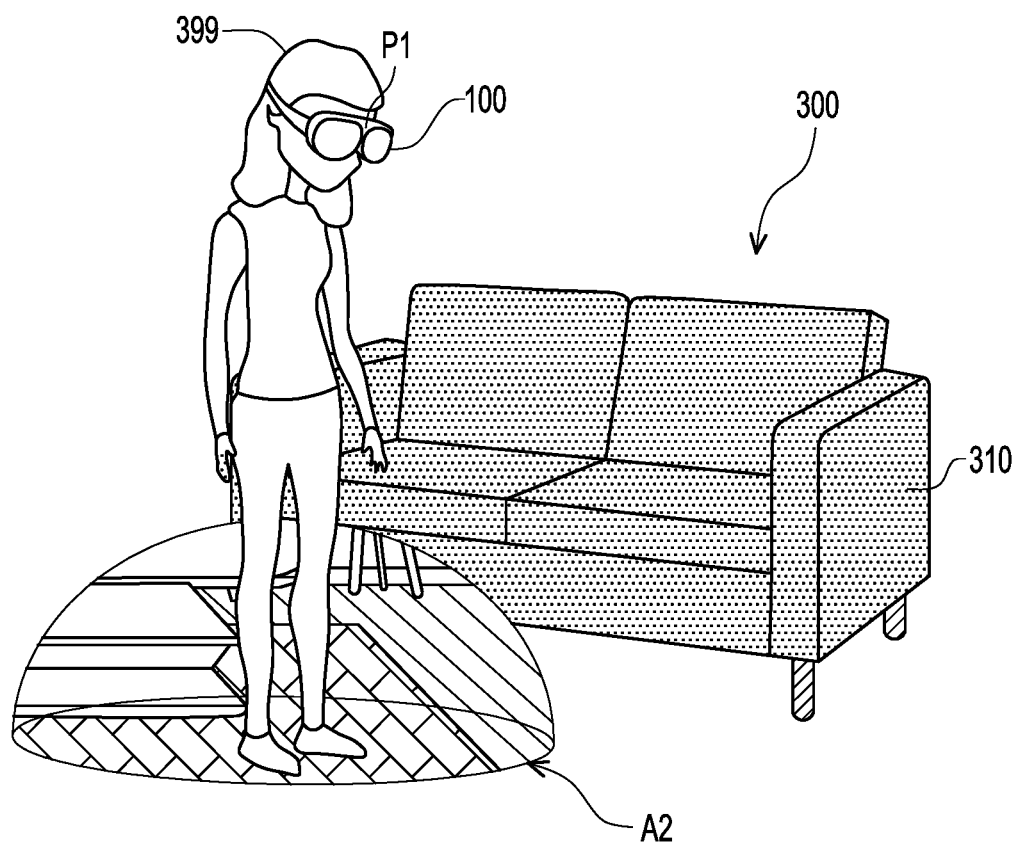
FIG. 5 shows a schematic diagram of modifying the appearance of the virtual bearing object according to a fifth embodiment of the disclosure.

See FIG. 5, which shows a schematic diagram of modifying the appearance of the virtual bearing object according to the second embodiment of the disclosure.

In the second embodiment, in the procedure of modifying the appearance of the virtual bearing object 310, the processor 104 may show a pass-through view corresponding to the second reference 3-dimensional area (e.g., the hemispherical area A2 in FIG. 3B) at the second reference 3-dimensional area.

In FIG. 5, in response to determining that the hemispherical area A2 has an overlapped area with the virtual bearing object 310, the processor 104 may determine that the relative position between the reference point and the virtual bearing object 310 meets the predetermined condition. In this case, the processor 104 may show the pass-through view corresponding to the hemispherical area A2 at the hemispherical area A2, wherein the pass-through view in this embodiment may also be cropped from the environment image captured by the front camera of the host 100, but the disclosure is not limited thereto.

Since the hemispherical area A2 has the overlapped area with the virtual bearing object 310, the appearance of the virtual bearing object 310 would be accordingly modified due to the overlapped area has been replaced with the corresponding pass-through view.

That is, the user 399 can see the real world scene in the pass-through view as shown in FIG. 5. In this case, the user 399 would notice that the virtual bearing object 310 is not a real world object and would not try to sit on the virtual bearing object 310.

That is, the pass-through view at the hemispherical area A2 can be shown as a visual cue for reminding the user 399 that the virtual bearing object 310 is not real. Accordingly, the risk of the user accidentally sitting on the virtual bearing object 310 can be reduced.

In one embodiment, the processor 104 may determine whether the relative position between the reference point and the virtual bearing object 310 has been updated. For example, in the above embodiments, the relative position between the reference point and the virtual bearing object 310 can be understood as being changed in response to the movement of the host 100 and/or the user 399. In this case, when the processor 104 determines that the host 100 and/or the user 100 has moved, the processor 104 may accordingly update the relative position between the reference point and the virtual bearing object 310, but the disclosure is not limited thereto.

In one embodiment, in response to determining that the relative position between the reference point and the virtual bearing object has been updated, the processor 104 may accordingly update the specific part on the virtual bearing object 310 and modify the appearance of the specific part on the virtual bearing object 310.

Taking FIG. 4A as an example, if the processor 104 detects that the user 399 has moved away from the virtual bearing object 310 by, for example, moving leftward, the second reference 3-dimensional area (e.g., the spherical area A3) would be moved leftward accordingly. In this case, the processor 104 would accordingly update the range of the overlapped area 310a (e.g., the specific part) and modify the appearance of the updated overlapped area 310a.

From another perspective, the range of the specific part would be changed in response to the movement of the host 100 and/or the user 399, but the disclosure is not limited thereto.

The disclosure further provides a computer readable storage medium for executing the method for providing a visual cue in a visual content. The computer readable storage medium is composed of a plurality of program instructions (for example, a setting program instruction and a deployment program instruction) embodied therein. These program instructions can be loaded into the host 100 and executed by the same to execute the method for providing a visual cue in a visual content and the functions of the host 100 described above.

To sum up, the embodiments of the disclosure provide a solution capable of modifying the appearance of the virtual bearing object when the relative position between the reference point (e.g., the user representative object in the visual content) and the virtual bearing object meets the predetermined condition. Accordingly the user would notice that the virtual bearing object is not a real world object and would not try to sit on the virtual bearing object, and hence the risk of the user accidentally sitting on the virtual bearing object 310 can be reduced.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for providing a visual cue in a visual content, adapted to a host, comprising:
   providing, by the host, the visual content, wherein the visual content comprises a virtual bearing object;
   determining, by the host, a relative position between a reference point and the virtual bearing object;
   determining, by the host, a first reference 3-dimensional area in the visual content based on the reference point;
   in response to determining that the virtual bearing object has an overlapped part with the first reference 3-dimensional area, determining, by the host, that the relative position meets a predetermined condition; and
   in response to determining that the relative position meets the predetermined condition, modifying, by the host, an appearance of the virtual bearing object based on the relative position, comprising:
   determining a specific part on the virtual bearing object based on the reference point, comprising:
   determining a second reference 3-dimensional area based on the reference point in the visual content; and
   in response to determining that the virtual bearing object has a second overlapped part with the second reference 3-dimensional area, determining the second overlapped part as the specific part, wherein the second reference 3-dimensional area is simultaneously determined with the first reference 3-dimensional area; and
   modifying an appearance of the specific part on the virtual bearing object.

2. The method according to claim 1, wherein the reference point corresponds to a user representative object in the visual content, or a projection point of the host on a floor plane in the visual content.

3. The method according to claim 1, further comprising:
   in response to determining that a specific distance between the reference point and the virtual bearing object is less than a first distance threshold, determining that the relative position meets the predetermined condition.

4. The method according to claim 1, wherein the step of modifying the appearance of the specific part on the virtual bearing object comprises at least one of the following:
   replacing the specific part with a pass-through view;
   changing a material of the specific part on the virtual bearing object; and
   replacing the specific part with a corresponding frame contour.

5. The method according to claim 1, wherein the step of modifying the appearance of the virtual bearing object based on the relative position comprises:
   showing a pass-through view corresponding to the second reference 3-dimensional area at the second reference 3-dimensional area.

6. The method according to claim 1, further comprising:
   in response to determining that the relative position between the reference point and the virtual bearing object has been updated, accordingly updating the specific part on the virtual bearing object and modifying the appearance of the specific part on the virtual bearing object.

7. The method according to claim 1, wherein the virtual bearing object has a virtual bearing surface that visually provides a bearing function.

8. A host, comprising:
   a non-transitory storage circuit, storing a program code; and
   a processor, coupled to the non-transitory storage circuit, and accessing the program code to perform:
   providing a visual content, wherein the visual content comprises a virtual bearing object;
   determining a relative position between a reference point and the virtual bearing object;
   determining a first reference 3-dimensional area in the visual content based on the reference point;
   in response to determining that the virtual bearing object has an overlapped part with the first reference 3-dimensional area, determining that the relative position meets a predetermined condition; and
   in response to determining that the relative position meets the predetermined condition, modifying an appearance of the virtual bearing object based on the relative position, comprising:
   determining a specific part on the virtual bearing object based on the reference point, comprising:

determining a second reference 3-dimensional area based on the reference point in the visual content; and in response to determining that the virtual bearing object has a second overlapped part with the second reference 3-dimensional area, determining the second overlapped part as the specific part, wherein the second reference 3-dimensional area is simultaneously determined with the first reference 3-dimensional area; and modifying an appearance of the specific part on the virtual bearing object.

9. The host according to claim 8, wherein the reference point corresponds to a user representative object in the visual content, or a projection point of the host on a floor plane in the visual content.

10. The host according to claim 8, wherein the processor further performs:

in response to determining that a specific distance between the reference point and the virtual bearing object is less than a first distance threshold, determining that the relative position meets the predetermined condition.

11. The host according to claim 8, wherein the processor performs at least one of the following:

replacing the specific part with a pass-through view;

changing a material of the specific part on the virtual bearing object; and replacing the specific part with a corresponding frame contour.

12. The host according to claim 8, wherein the processor performs:

showing a pass-through view corresponding to the second reference 3-dimensional area at the second reference 3-dimensional area.

13. The host according to claim 8, wherein the processor further performs:

in response to determining that the relative position between the reference point and the virtual bearing object has been updated, accordingly updating the specific part on the virtual bearing object and modifying the appearance of the specific part on the virtual bearing object.

14. A non-transitory computer readable storage medium, the non-transitory computer readable storage medium recording an executable computer program, the executable computer program being loaded by a processor of a host to perform steps of:

providing a visual content, wherein the visual content comprises a virtual bearing object;

determining a relative position between a reference point and the virtual bearing object;

determining a first reference 3-dimensional area in the visual content based on the reference point;

in response to determining that the virtual bearing object has an overlapped part with the first reference 3-dimensional area, determining that the relative position meets a predetermined condition; and in response to determining that the relative position meets the predetermined condition, modifying an appearance of the virtual bearing object based on the relative position, comprising:

determining a specific part on the virtual bearing object based on the reference point, comprising:

determining a second reference 3-dimensional area based on the reference point in the visual content; and in response to determining that the virtual bearing object has a second overlapped part with the second reference 3-dimensional area, determining the second overlapped part as the specific part, wherein the second reference 3-dimensional area is simultaneously determined with the first reference 3-dimensional area; and modifying an appearance of the specific part on the virtual bearing object.

* * * * *